United States Patent [19]

Yasue et al.

[11] Patent Number: 4,700,591
[45] Date of Patent: Oct. 20, 1987

[54] HYDRAULIC SHIFT CONTROLLER FOR AN AUTOMATIC TRANSMISSION HAVING A FIRST AND SECOND SECTION

[75] Inventors: Hideki Yasue; Kagenori Fukumura, both of Toyota, Japan

[73] Assignee: Toyota Jidosha Kabushiki Kaisha, Toyota, Japan

[21] Appl. No.: 854,598

[22] Filed: Apr. 22, 1986

[30] Foreign Application Priority Data

Apr. 24, 1985 [JP] Japan ................... 60-87985

[51] Int. Cl.$^4$ ............................. B60K 41/06
[52] U.S. Cl. ..................... 74/868; 74/740; 74/752 C
[58] Field of Search ............ 74/740, 752 C, 762, 74/763, 766, 767, 867, 868

[56] References Cited

U.S. PATENT DOCUMENTS

| 4,043,223 | 8/1977 | Ohnuma et al. | 74/740 X |
| 4,098,148 | 7/1978 | Wayman | 74/868 X |
| 4,129,051 | 12/1978 | Shindo et al. | 74/867 |
| 4,304,153 | 12/1981 | Moroto et al. | 74/763 X |
| 4,368,650 | 1/1983 | Numazawa et al. | 74/740 |
| 4,388,844 | 6/1983 | Arai et al. | 74/752 C |
| 4,406,181 | 9/1983 | Kubo et al. | 74/868 X |
| 4,476,747 | 10/1984 | Kawamoto | 74/868 |

FOREIGN PATENT DOCUMENTS 0028579  5/1981  European Pat. Off. ......... 74/752 C

Primary Examiner—Leslie Braun
Assistant Examiner—Dwight G. Diehl
Attorney, Agent, or Firm—Oblon, Fisher, Spivak, McClelland, & Maier

[57] ABSTRACT

A hydraulic controller for the hydraulic pressure in an automatic transmission for a vehicle, which includes at least a first transmission section capable of automatically shifting gears in association with at least vehicle speed and engine load, and a second transmission section capable of automatically shifting between the lower gear side and the higher gear side, and being arranged on a output side of the first transmission section, and the first transmission section and the second transmission section are simultaneously or alternately shifted, to thereby achieve multi-gear shifts, wherein the hydraulic pressure of a frictionally engaging device for shifting the second transmission section into the high gear side at the time of the shift is varied in accordance with output shaft torque of the first transmission section. With this arrangement, the high gear shift of the second transmission section can be carried out by optimal acting forces for the respective shifts, so that a balance between improvements in the durability of the frictionally engaging device and reduction of shift shocks can be satisfactorily maintained.

6 Claims, 6 Drawing Figures

FIG. 3

| SHIFT POSITION | GEARS | C0 | C1 | C2 | B0 | B1 | B2 | B3 | F0 | F1 | F2 |
|---|---|---|---|---|---|---|---|---|---|---|---|
| P | NEUTRAL | O | | | IN OVERDRIVE SECOND T.M.S | | | | | | |
| R | REVERSE | O | | O | | | | O | | | |
| N | NEUTRAL | O | | | | | | | | | |
| D OR 2 | 1ST (FIRST T.M.S) | O | O | | | | | | O | | O |
| D | 2ND (↑) | O | O | | | | O | | O | O | |
| D | 3RD (↑) | O | O | O | | | O | | O | | |
| 2 | 2ND | O | O | | | O | O | | O | O | |
| L | 1ST | O | O | | | | | O | O | | O |

O = SHOWS IN OPERATION

FIG. 4

| GEARS OF AUTOMATIC TRANSMISSION AS A WHOLE | GEARS OF FIRST TRANSMISSION SECTION | GEARS OF SECOND TRANSMISSION SECTION |
|---|---|---|
| 1ST | 1ST | NON-OVERDRIVE |
| 2ND | ↑ | OVERDRIVE |
| 3RD | 2ND | NON-OVERDRIVE |
| 4TH | ↑ | OVERDRIVE |
| 5TH | 3RD | NON-OVERDRIVE |
| 6TH | ↑ | OVERDRIVE |

HYDRAULIC SHIFT CONTROLLER FOR AN AUTOMATIC TRANSMISSION HAVING A FIRST AND SECOND SECTION

BACKGROUND OF THE INVENTION

1. Field of the Invention

This invention relates to a hydraulic shift controller for an automatic transmission of a vehicle, and more particularly to improvements in a hydraulic shift controller for an automatic transmission for a vehicle, wherein there are provided at least a first transmission section capable of automatically shifting gears in association with at least vehicle speed and engine load and a second transmission section capable of automatically shifting between the lower gear side and the higher gear side, and wherein the first transmission section and the second transmission section are simultaneously or alternately shifted, to thereby achieve multi-gear shifts.

2. Description of the Prior Art

Along with a rapid application of the automatic transmissions to motor vehicles, with mainly the intention of improved fuel consumption rate, there have been commonly adopted transmissions wherein a so-called overdrive device, in which a transmission gear ratio is less than 1, is connected in series to an output shaft of a first transmission section capable of automatically shifting gears in association with vehicle speed, throttle opening and the like as a second transmission section.

Furthermore, such a transmission is also know wherein, based on a function of the second transmission section capable of shifting between the lower gear side and the higher gear side as seen with the above-described overdrive device, the second transmission section is caused to be actively tuned to shifts of the first transmission section, and the first transmission section and the second transmission section are simultaneously or alternately shifted, whereby the shift control shown in FIG. 4 is performed for example, so that multi-gear shifting of six forward gears can be achieved.

The above-described arrangement makes it possible for the existing automatic transmission to be utilized as the first transmission section and changes in design are minimized for the manufacturing advantage, so that multi-gear shifts can be achieved. As a result, many advantages can be offered such that the rate of fuel consumption is improved, shift shocks are reduced and the load is relieved from a frictionally engaging device due to making the gear shifts into multi-gear shifts.

However, in the automatic transmission, wherein the first and the second transmission sections are shifted simultaneously or alternately to achieve the multi-gear shifts, there has existed a disadvantage in that, when an acting force of the frictionally engaging device for the high gear shift of the second transmission section is varied only in accordance with the throttle opening, as performed in an ordinary up shift, it has been difficult to obtain satisfactory shift characteristics (including the problem of durability) over all the shifts achieved by the high gear shift of the second transmission section.

More specifically, as apparent from FIG. 4, as for the shifts from 1st gear to 2nd gear, from 3rd gear to 4th gear and 5th gear to 6th gear, up shifting of the automatic transmission as a whole is realized only by a high gear shift of the second transmission section, with the first transmission section remaining as it is. In this case, the input torques to the second transmission section are greatly varied in accordance with each gear of the first transmission section, whereby a transmitted torque required from the frictionally engaging device in the second transmission section is greatly influenced by the gear of this first transmission section (See FIG. 6 for example). As a consequence, in the case where the hydraulic pressure of the frictionally engaging device for shifting the second transmission section into the high gear side remains the same at the time of the each each shift, when 1st gear is shifted into 2nd gear for example, the engaging time duration is prolonged due to the deficiency of the hydraulic pressure, whereby the durability is considerably lowered. Or, when 5th gear is shifted into 6th gear, a sudden change in the torque occurs due to the excessively high hydraulic pressure, whereby the shift shock is increased.

SUMMARY OF THE INVENTION

The present invention has been developed to obviate the above-described disadvantages of the prior art and has as its object the provision of a hydraulic shift controller for an automatic transmission of a vehicle, wherein, at the time of all of the shifts including the high gear shift of the second transmission section, satisfactory shift characteristics (including overcoming of the problem of the durability) can be obtained at all times.

To this end, the present invention contemplates that, in a hydraulic shift controller for an automatic transmission of a vehicle, there are provided at least a first transmission section capable of automatically shifting gears in association with at least vehicle speed and engine load and a second transmission section capable of automatically shifting between the lower gear side and the higher gear side, and the first transmission section and second transmission section are simultaneously or alternately shifted, to thereby achieve multi-gear shifts, there is provided means for varying the hydraulic pressure of the frictionally engaging device for shifting the second transmission into the high gear since at the time of the shift in accordance with an output shaft torque of the first transmission section.

Furthermore, a specific form of the present invention is of such an arrangement that, as the aforesaid means, a construction is adopted wherein a regulating valve provided in an hydraulic line to the frictionally engaging device controls the hydraulic pressure, so that the above-described object can be achieved by a simplified construction.

Another specific form of the present invention is of such an arrangement that, as the aforesaid means, such construction is adopted wherein the hydraulic pressure is controlled in accordance with each of the gears of the first transmission section, whereby output shaft torque of the first transmission section can be easily grasped without using a torque sensor and the like, so that the desired object of the present invention can be achieved at low cost.

According to the present invention, the hydraulic pressure of the frictionally engaging device for shifting the second transmission section into the high gear side at the time of shifting can be varied in accordance with output shaft torque of the first transmission section, whereby the high gear shift of the second transmission section is performed by use of the acting forces optimally for the respective shifts, so that the shift characteristics when the second transmission section engages can be satisfactory at all times. As a consequence, a balance between the improvement in the durability of the frictionally engaging device and a reduction of shift shocks can be satisfactory maintained.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 3 is a chart showing the combinations of engagements of the frictionally engaging device in the automatic transmission;

FIG. 4 is a chart showing the relationship between the first transmission section and the second transmission section;

DESCRIPTION OF THE PREFERRED EMBODIMENT

A detailed description will now be given of one embodiment of the present invention with reference to the drawings.

Figure 2:
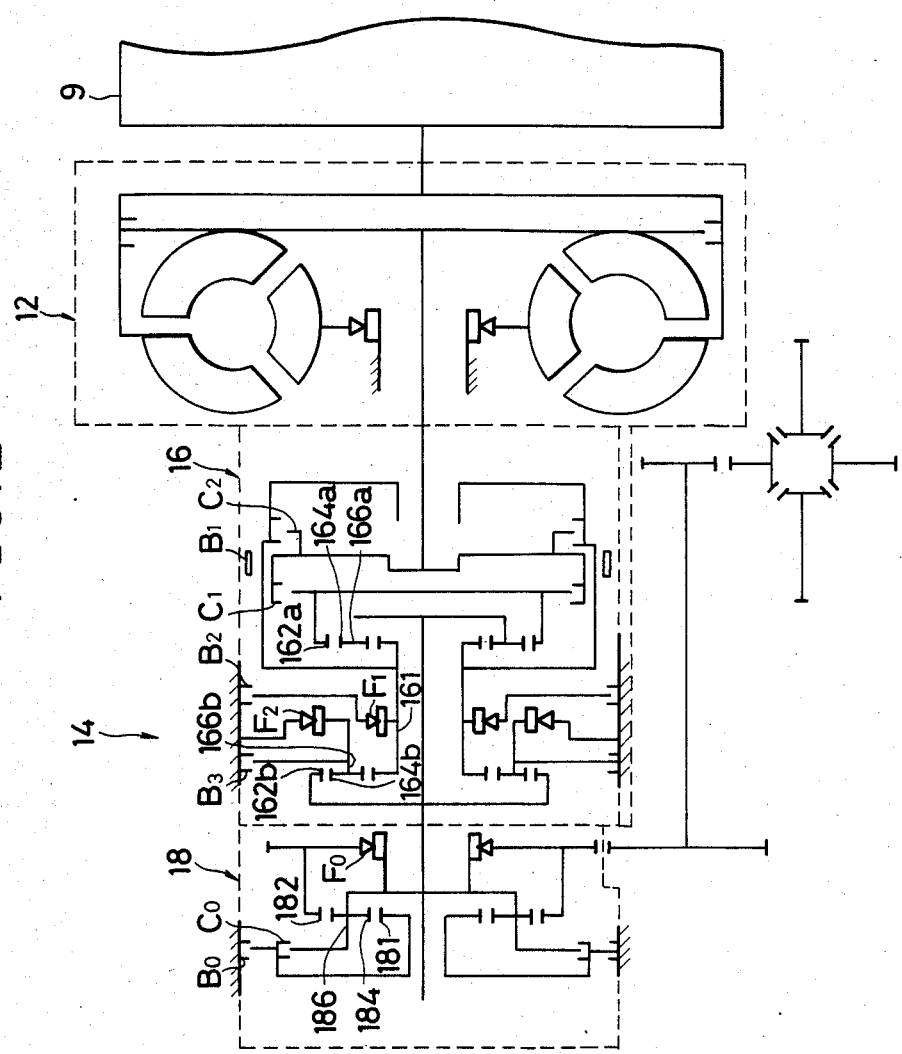
FIG. 2 is a skeletal diagram showing the automatic transmission for a vehicle, to which is applied the above-mentioned embodiment.

FIG. 2 is the skeletal diagram showing the automatic transmission of FF (Front engine - Front wheel drive), to which is applied the present invention. This automatic transmission includes a torque converter 12 and a transmission 14, which are provided coaxially with an engine 9.

The transmission 14 is constituted by a first transmission section 16 and a second transmission section 18, which is connected in series to an output shaft of the first transmission section 16. Here, the first transmission section 16 is a standard drive and has three forward gears. In addition, the second transmission section 18 is an overdrive device and has two forward gears including a lower gear of a reduction gear of 1 and a higher overdrive gear.

The first transmission section 16 is provided with two planetary gear units, one on the front side and the other on the rear side, each comprising a sun gear 161, commonly used for the two planetary gear units, ring gears 162a and 162b, planetary pinions 164a and 164b, and carriers 166a and 166b. Rotation of each of the planetary gear units is controlled by clutches C1 and C2, brakes B1, B2 and B3 and one-way clutches F1 and F2. On the other hand, the second transmission section 18 is provided with a planetary gear unit including a sun gear 181, a ring gear 182, a planetary pinion 184, and a carrier 186. Rotation of the planetary gear unit is controlled by a clutch C0, a brake B0 and a one-way clutch F0. Since the specific arrangements of connection of the first and the second transmission sections 16 and 18 are well known, a detailed description of the same will be omitted, and instead will be shown only in a skelton fashion showing the arrangements in FIG. 2.

Additionally, in achieving the gears, the frictionally engaging devices such as the brakes and clutches are controlled as shown in FIG. 3. The second transmission section is put into low gear side by clutch C0 ON, brake B0 OFF, and into high gear side by clutch C0 OFF, brake B0 ON.

Figure 1:
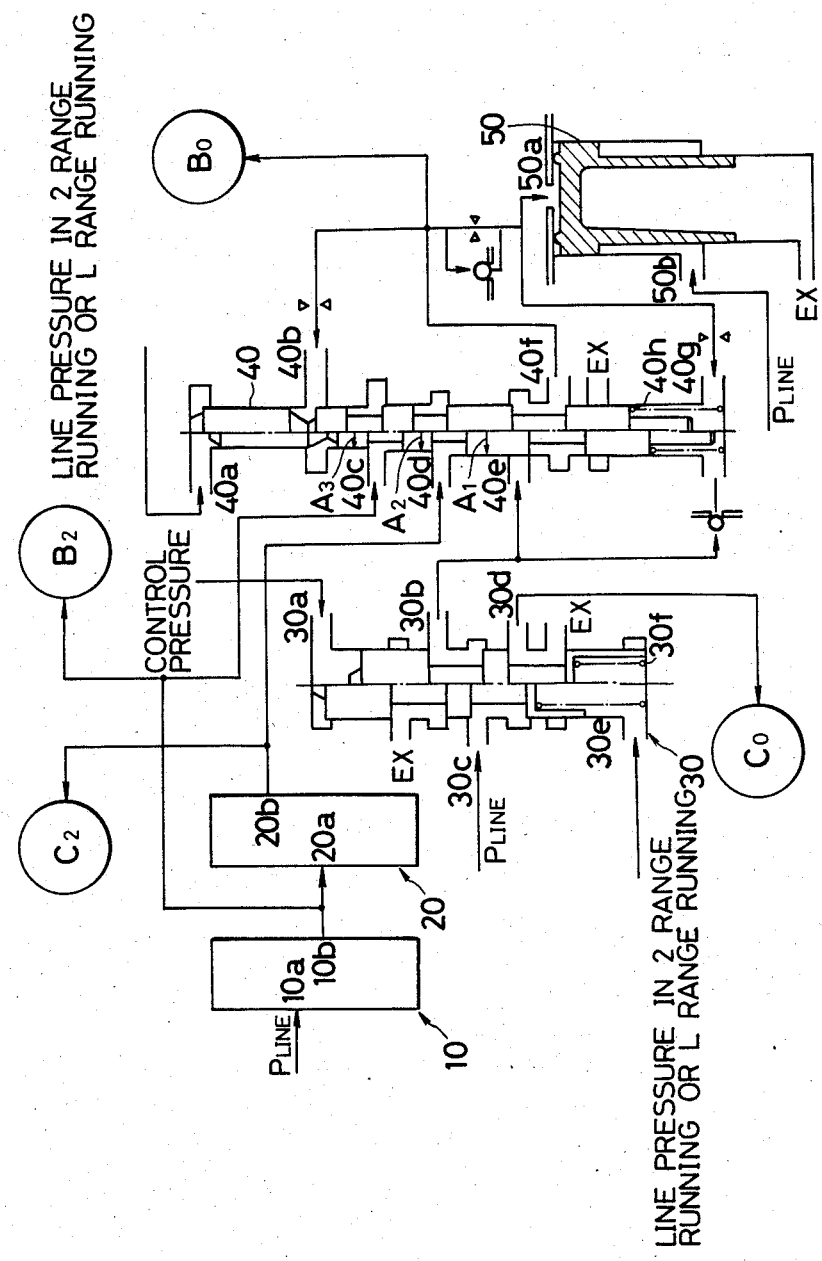
FIG. 1 is a hydraulic control circuit diagram partially showing one embodiment of the hydraulic controller for an automatic transmission of a vehicle according to the present invention.

FIG. 1 partially shows the hydraulic control circuit for controlling the automatic transmission. Portions not shown or simplified portions are basically identical with the well-known conventional automatic transmission.

A 1-2 shift valve 10 includes a change-over valve for control between 1st gear and 2nd gear of the first transmission section 16, and shuts a port 10b from the line pressure of a port 10a, whereby the first transmission section 16 is into 1st gear. On the other hand, when the port 10a and the port 10b are communicated with each other and the line pressure is supplied to a brake B2 to bring the same into engagement, the first transmission section 16 is put into 2nd gear.

A 2-3 shift valve 20 is a change-over valve for control between 2nd gear and 3rd gear of the first transmission section 16. When the 1-2 shift valve 10 is 2nd gear, a port 20b and a port 20a of the 2-3 shift valve 20 are communicated with each other, and the line pressure is supplied to a clutch C2 to bring the same into engagement, and the first transmission section 16 is put into 3rd gear. Switching of the 1-2 shift valve 10 and the 2-3 shift valve 20 is carried out by a balance between a throttle pressure commensurate with the throttle opening and a governor pressure commensurate with vehicle speed, or, carried out by a supply or an exhaust of control hydraulic pressure due to ON - OFF of an electromagnetic solenoid valve computer-driven as commensurate with the throttle opening (or an output shaft torque of the engine), vehicle speed and the like.

A O/D shift valve 30 includes a change-over valve for controlling the shift of the second transmission section 18, and, when a port 30c and a port 30d are communicated with each other in the state shown to the left portion of the drawing, and the line pressure is supplied to the clutch C0 to bring the same into engagement, the second transmission section 18 is put into a lower gear side. On the other hand, when the port 30c and a port 30b are communicated with each other in the state shown to the right portion of the drawing, and a port 40e and a port 40f are communicated with each other to supply the line pressure to the brake B0 to bring the same into engagement, the second transmission section 18 is put into higher gear side. Switching of the O/D shift valve 30 is achieved by a balance between a control hydraulic pressure acting on a port 30a and the line pressure acting on the port 30e in 2 range running or L range running.

An accumulator control valve 40 of a brake B0 comprises a regulating valve for regulating the line pressure at the time of engagement of the brake B0, and the regulation being basically carried out by B0 pressure acting on a port 40b, hydraulic pressure determined by a B0-accumulator 50 acting on a port 40g and a spring 40h. As shown in FIG. 1, the pressure provided at the top of valve 40 comprises a line pressure communicated to port 40a from a conventional manual valve connected with a manual shift lever located adjacent the drivers seat. The B0-accumulator 50 has the function of decreasing the hydraulic pressure of the port 50a by the line pressure acting on the port 50b.

Figure 5:
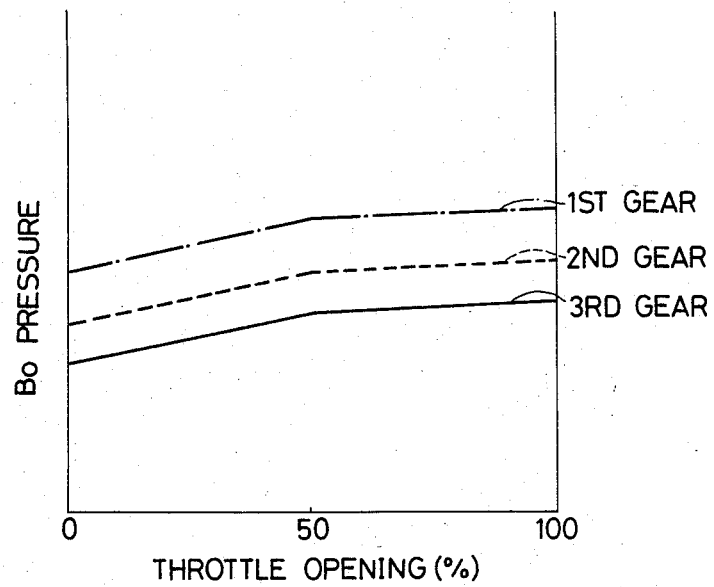
FIG. 5 is a chart showing the relationship between the throttle opening and the hydraulic pressure of a brake B0 by use of the gears of the first transmission section as the parameters.

In this embodiment, in order to control the B0 pressure of the second transmission section 18 by the gears of the first transmission section 16, the B2 pressure is fed back to a port 40c of the B0-accumulator control valve 40 and the C2 pressure is fed back to a port 40d. A face area of a spool of the B0-accumulator control valve 40 is shown as A1>A2>A3 in the drawing, whereby the B0 pressure is highest in 1st gear where both the B2 pressure and the C2 pressure are not working, next highest in 2nd gear when only the B2 pressure is working, and lowest is 3rd gear where both the B2 pressure and the C2 pressure are working. This relationship is shown in FIG. 5. FIG. 5 shows the pressure regulation of the B0-accumulator control valve 40 to the throttle opening, and it is apparent that the higher the gears of the first transmission section, the lower the hydraulic pressure used for regulating becomes.

Figure 6:
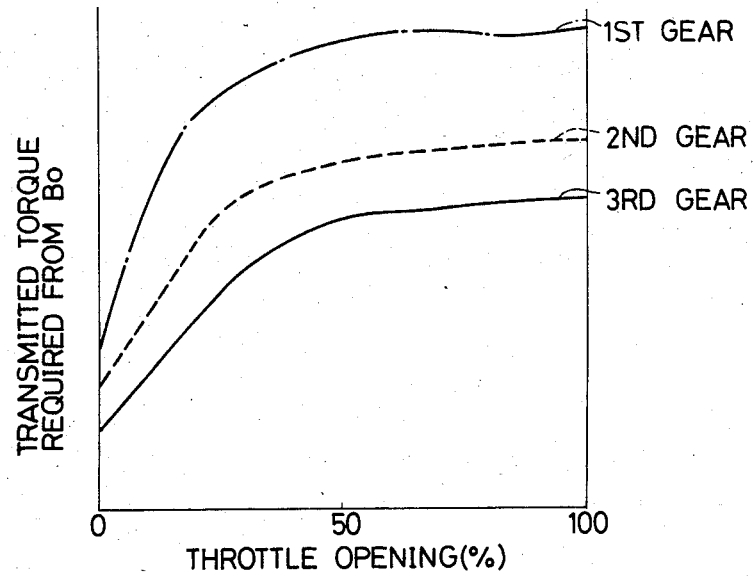
FIG. 6 is a chart showing the relationship between the throttle opening and the transmitted torque required from the break B0 by use of the gears of the first transmission section as the parameters.

Now, in the automatic transmission in this embodiment, the second transmission section 18 is provided on the output shaft of the first transmission section 16, whereby, at the time of the 1st - 2nd gear shift, the 3rd - 4th gear shift, the 5th - 6th gear shift in the gears of the automatic transmission as a whole (refer to FIG. 4), the capacity of the brake B0 required for transmitting is varied in accordance with each of the gear ratios of the gears of the first transmission section 16. FIG. 6 shows this relationship. As a consequence, as in this embodiment, the B0 pressure is regulated to the pressure shown in FIG. 5 by the gears of the first transmission section 16, so that it is contemplated that an improvement in the durability of the frictionally engaging device and reduction in the shift shocks in the shifts of the 1st - 2nd gear shift, the 3rd - 4th gear shift, and the 5th - 6th gear shift will result.

More specifically, if the B0 pressure is fixed and regulated to the value suitable for the 3rd - 4th gear shift, in the 1st - 2nd gear shift, the hydraulic pressure in the frictionally engaging device is insufficient for the torque to be transmitted, whereby the time duration for engagement (i.e. time duration required for the shift) is prolonged, so that durability is lowered to a considerable extent. On the other hand, in the 5th - 6th gear shift, the engagement is suddenly performed under a high hydraulic pressure beyond that required, whereby the shift shock is deteriorated. In this embodiment, in every one of the shifts of 1st - 2nd, 3d - 4th, 5th - 6th, the engagements are performed under the optimal pressure, so that improvements in the durability of the frictionally engaging device and reduction in the shift shocks can be made compatible with each other.

Additionally, in the above-described embodiment, the output shaft torque of the first transmission section has been judged by each of the gears of the first transmission section, however, the present invention need not necessarily be limited to this, and, it is apparent that an arrangement may be adopted such that, for example, a torque sensor is directly provided on the output shaft of the first transmission section or the input shaft of the second transmission section, whereby the torque actually inputted to the second transmission section is detected, so that the B0 pressure is variable in accordance therewith.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hydraulic shift controller for an automatic transmission of a vehicle, comprising:
   a first transmission section for automatically shifting gears in association with at least vehicle speed and engine load,
   a second transmission section for automatically shifting between a lower gear side and a high gear side, and being arranged on a output side of the first transmission section, wherein the first transmission section and the second transmission section are selectively shifted, to thereby achieve multi-gear shifts;
   a frictionally engaging device located in said second transmission section; and
   means for varying the hydraulic pressure of said frictionally engaging device for shifting the second transmission section in accordance with an output shaft torque of the first transmission section.

2. A hydraulic shift controller as set forth in claim 1, wherein said first transmission section comprises an underdrive type transmission having three forward gears, and said second transmission section comprises an overdrive type transmission having two forward gears including a lower gear of a reduction gear ratio of 1 and a higher gear for overdrive.

3. A hydraulic shift controller as set forth in claim 1, wherein said means for varying the hydraulic pressure comprises a regulating valve provided in an hydraulic line to said frictionally engaging device.

4. A hydraulic shift controller as set forth in claim 1, wherein said means for varying the hydraulic pressure is further controlled in accordance with each of the gears of said first transmission section.

5. A hydraulic shift controller as set forth in claim 4, wherein said means for varying the hydraulic pressure comprises a regulating valve having a plurality of ports, and wherein all hydraulic pressure directed to frictionally engaging devices, for shifting the gears of said first transmission section, is fed back to said plurality of ports of said regulation valve.

6. A hydraulic shift controller as set forth in claim 5, wherein said regulating valve includes a spool having faces for receiving said feed back hydraulic pressure, the areas of which are varied, so that the higher the gear, the lower the pressure required for shifting said second transmission into the higher gear side becomes.

* * * * *